Nov. 14, 1972 T. FESTNER ET AL 3,702,796

MACHINE FOR PRODUCING MAGNETIC BELT RECORDS

Filed Sept. 22, 1969 8 Sheets-Sheet 1

INVENTORS
THEODOR FESTNER
THEODORE J. LITWIN
HANS W. PREUSS
BY George H. Fritzinger
AGENT

MACHINE FOR PRODUCING MAGNETIC BELT RECORDS

Filed Sept. 22, 1969 8 Sheets-Sheet 2

INVENTORS
THEODOR FESTNER
THEODORE J. LITWIN
HANS W. PREUSS
BY George H Fritzinger
AGENT INVENTORS
THEODOR FESTNER
THEODORE J. LITWIN
HANS W. PREUSS
BY George H. Fritzinger
AGENT

MACHINE FOR PRODUCING MAGNETIC BELT RECORDS

Filed Sept. 29, 1969 8 Sheets-Sheet 4

INVENTORS
THEODOR FESTNER
THEODORE J. LITWIN
HANS W. PREUSS
BY George H. Fritzinger
AGENT INVENTORS
THEODOR FESTNER
THEODORE J. LITWIN
HANS W. PREUSS
BY George H. Fritzinger
AGENT

MACHINE FOR PRODUCING MAGNETIC BELT RECORDS

Filed Sept. 22, 1969 8 Sheets-Sheet 6

INVENTORS
THEODOR FESTNER
THEODORE J. LITWIN
HANS W. PREUSS
BY
AGENT

MACHINE FOR PRODUCING MAGNETIC BELT RECORDS

Filed Sept. 29, 1969

INVENTORS
THEODOR FESTNER
THEODORE J. LITWIN
HANS W. PREUSS
BY George H. Fritzinger
AGENT

MACHINE FOR PRODUCING MAGNETIC BELT RECORDS

Filed Sept. 22, 1969 8 Sheets-Sheet 8

INVENTORS
THEODOR FESTNER
THEODORE J. LITWIN
HANS W. PREUSS
BY George H. Fritzinger
AGENT United States Patent Office 3,702,796

Patented Nov. 14, 1972

3,702,796
MACHINE FOR PRODUCING MAGNETIC BELT RECORDS

Theodor Festner, Upper Saddle River, Theodore J. Litwin, Edison, and Hans W. Preuss, Wayne, N.J., assignors to Festner Consulting Associates, Upper Saddle River, N.J.

Filed Sept. 22, 1969, Ser. No. 859,617
Int. Cl. B32b *31/00*
U.S. Cl. 156—512 20 Claims

ABSTRACT OF THE DISCLOSURE

A machine for producing flexible belt records for dictating machines is programmed to complete automatically a cycle of successive step operations to draw strips of a wide magnetic record tape from a supply roll, attach each strip to a pair of spaced folding arms, cut off each strip on a bias to a predetermined length along the outer edges of the folding arms, move the arms to fold the strip into a closed loop with the end edges abutting evenly with each other, and then apply a length of pressure-sensitive splicing tape on the uncoated side of the record tape across the abutting edges to secure the loop into a permanent belt record.

An object of the invention is to provide a novel machine which is hydraulically operated to produce successive belt records efficiently and economically on a production scale without need for an operator except to keep the machine supplied with the necessary record and splicing tapes.

Another object is to provide such machine which will produce magnetic belt records of superior quality having the end edges of each loop abutting uniformly with minimum gap and spliced securely by a firmly adhering splicing tape applied uniformly without entrapment of air bubbles.

Another object is to program such machine so that it will operate automatically through its successive cycles to produce successive belts without interruption and with maximum economy.

In the description of our invention reference is had to the accompanying drawings of which:

FIGS. 1A and 1B when joined along the dash-dot line A—A form a top plan view of the present belt-record producing machine;

Figure 1A:
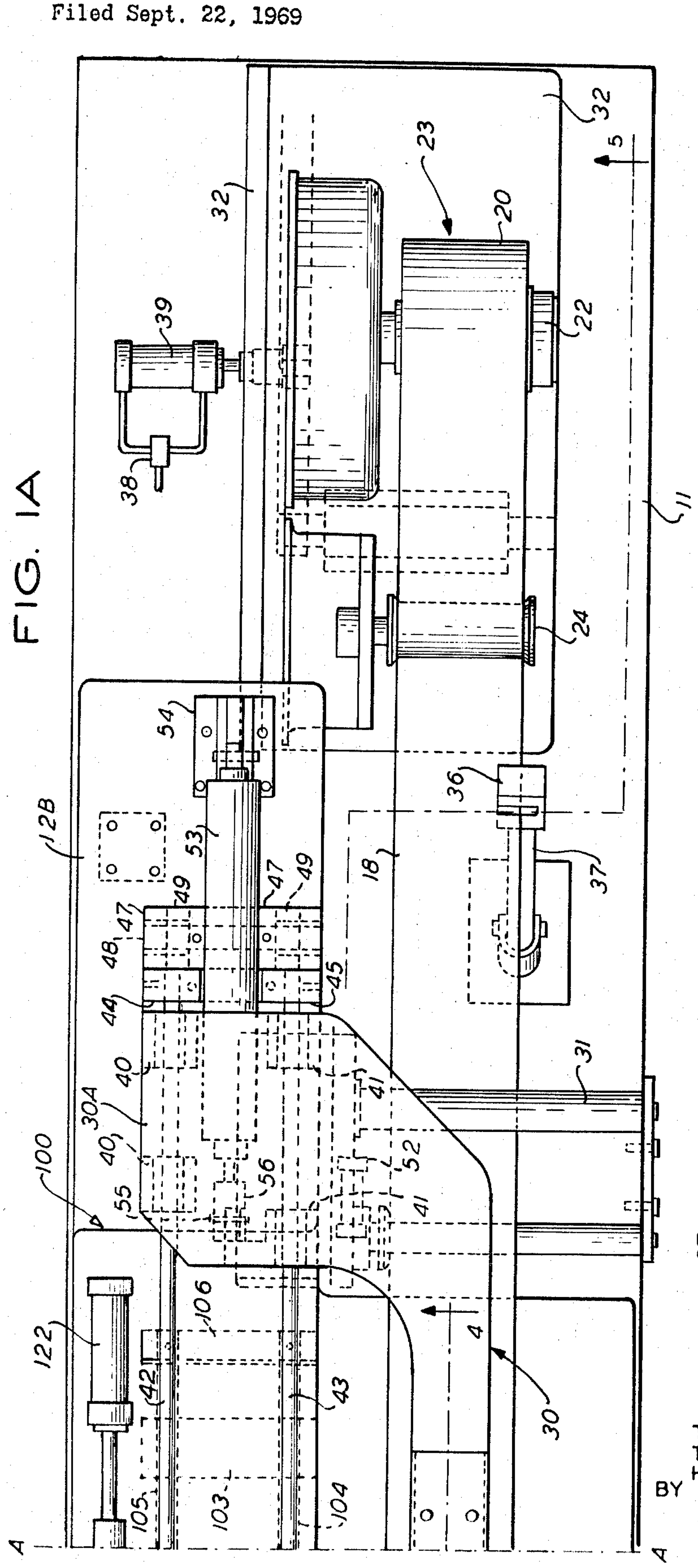
Figure 1B:
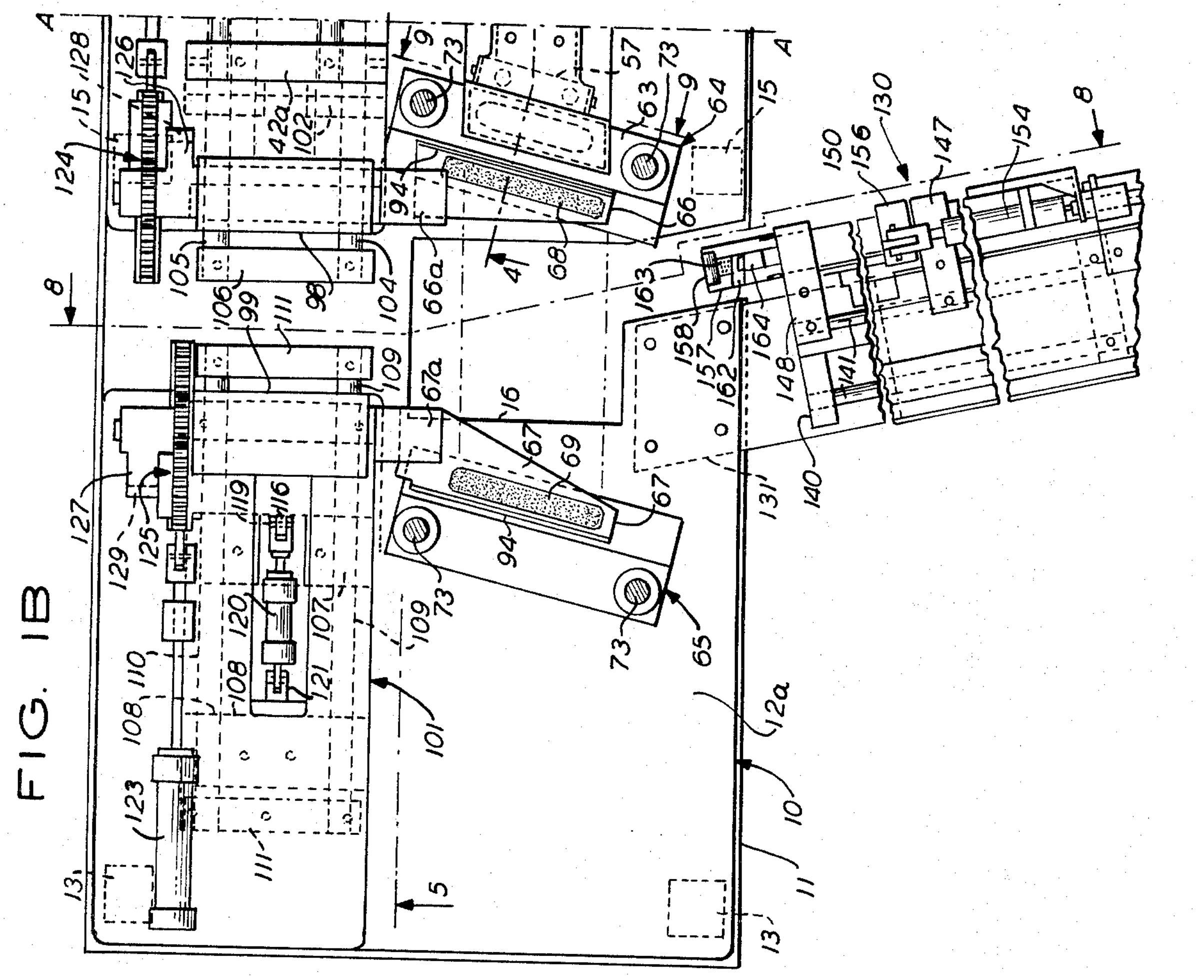
Figure 5A:
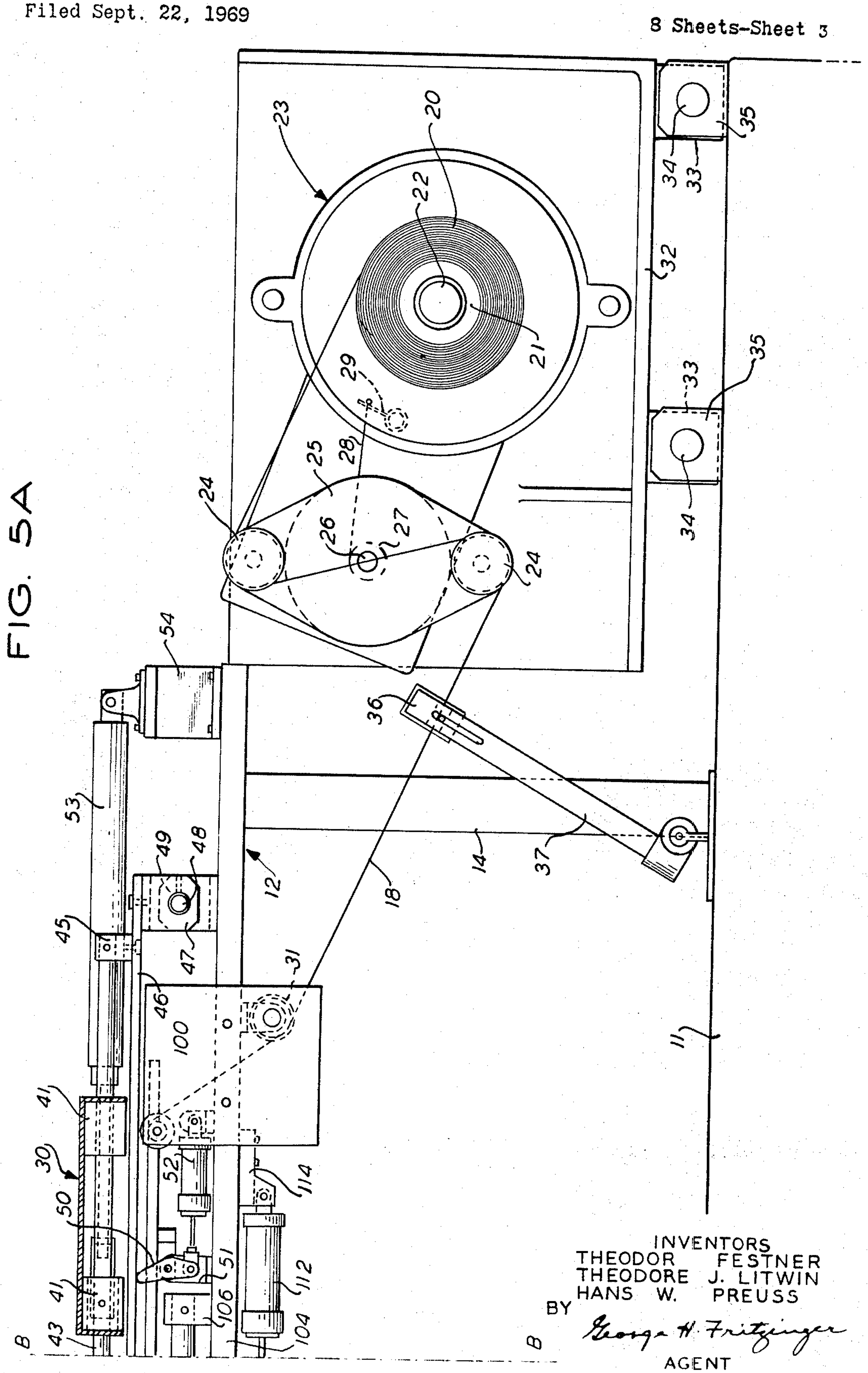
Figures 5B, 6, 7:
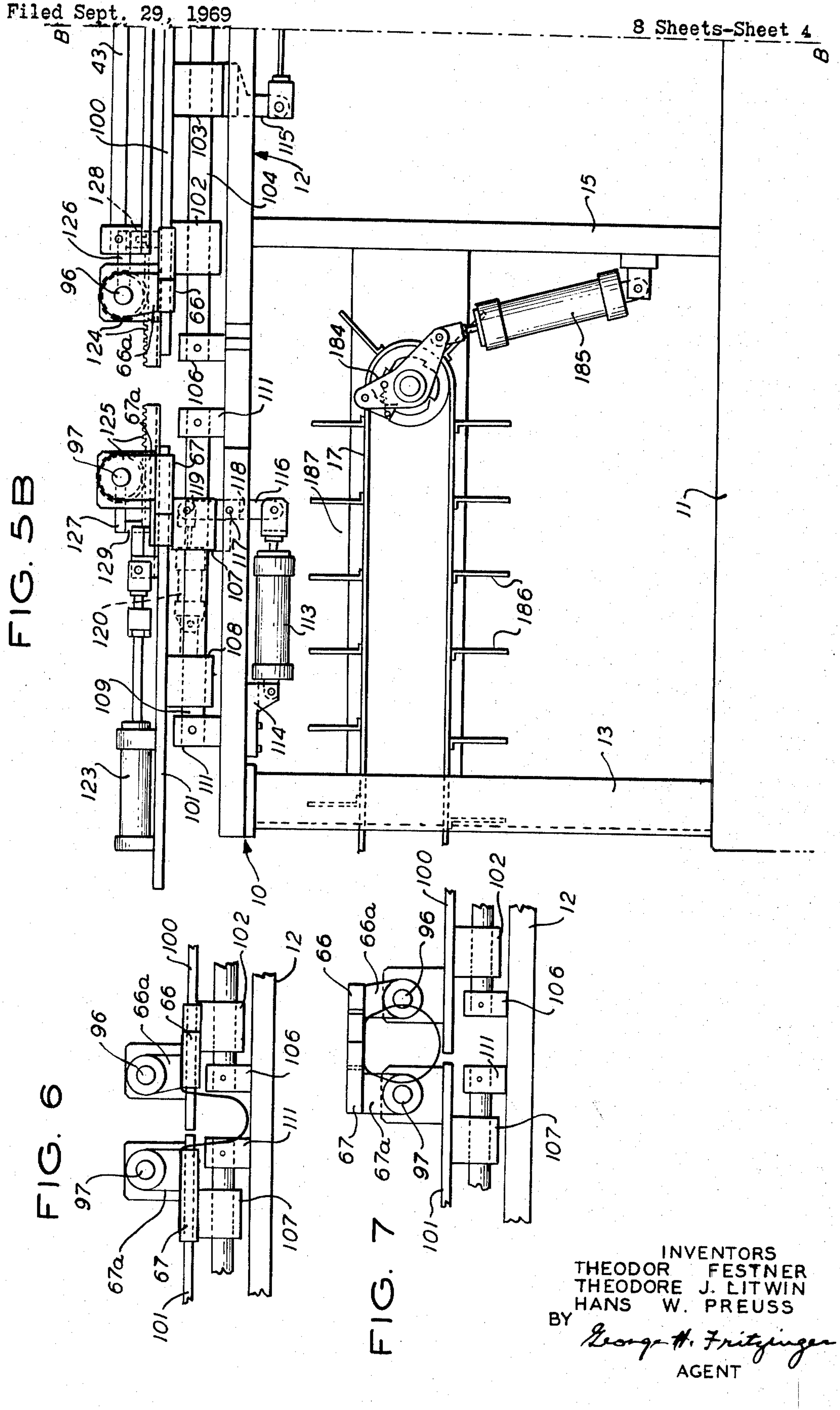
Figure 8:
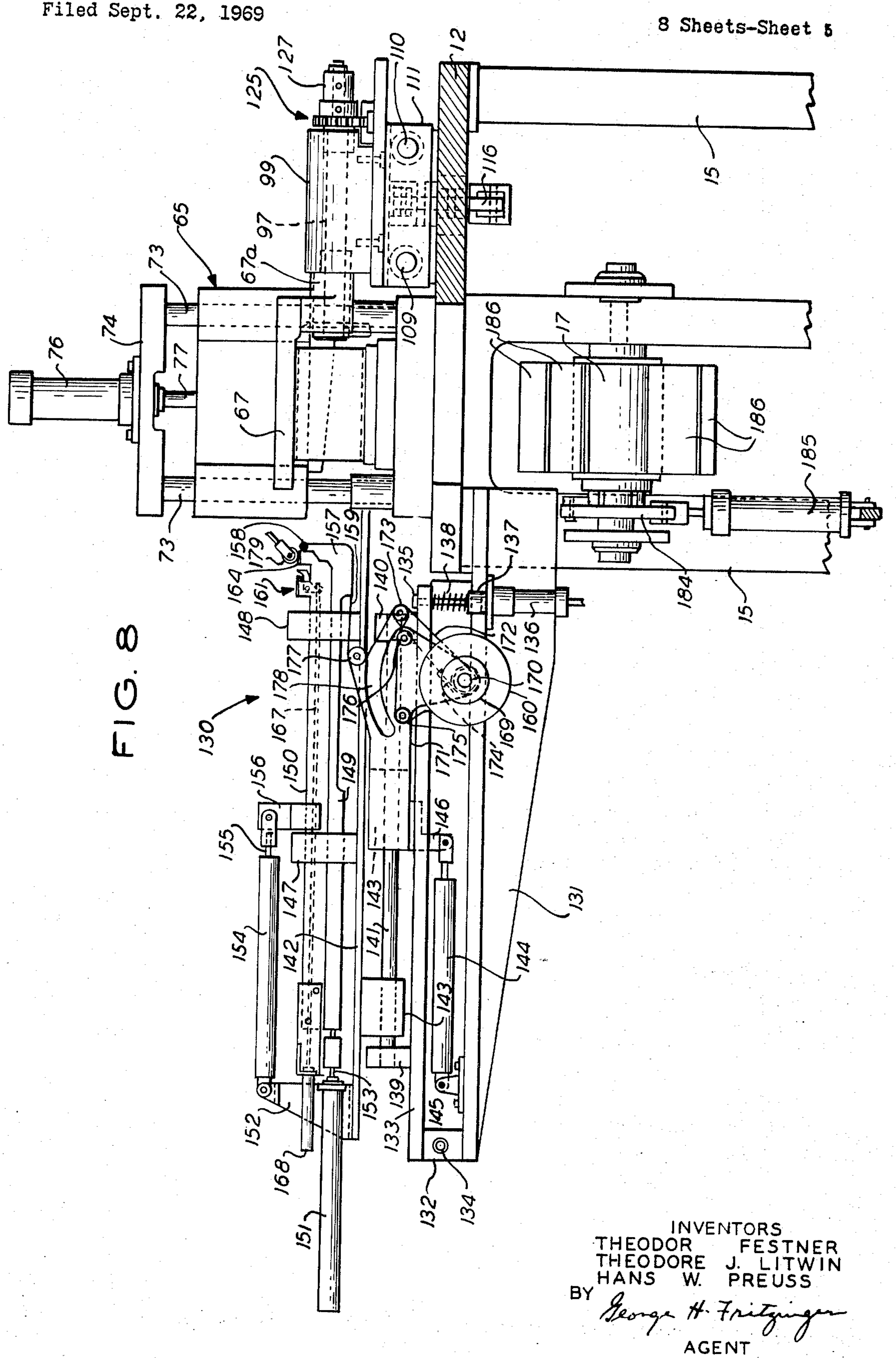
Figures 9, 10, 11:
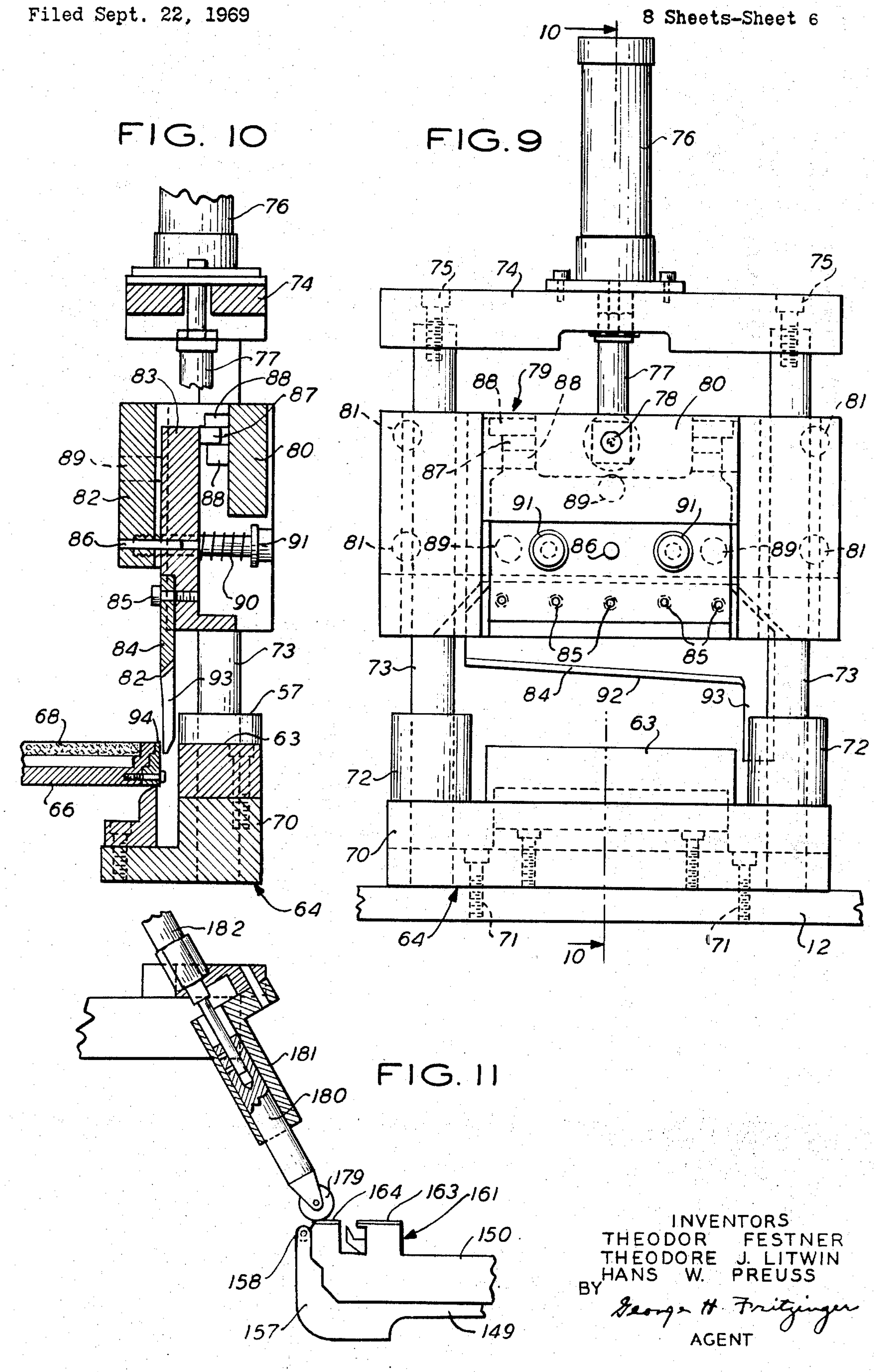
Figures 12, 13, 14, 15:
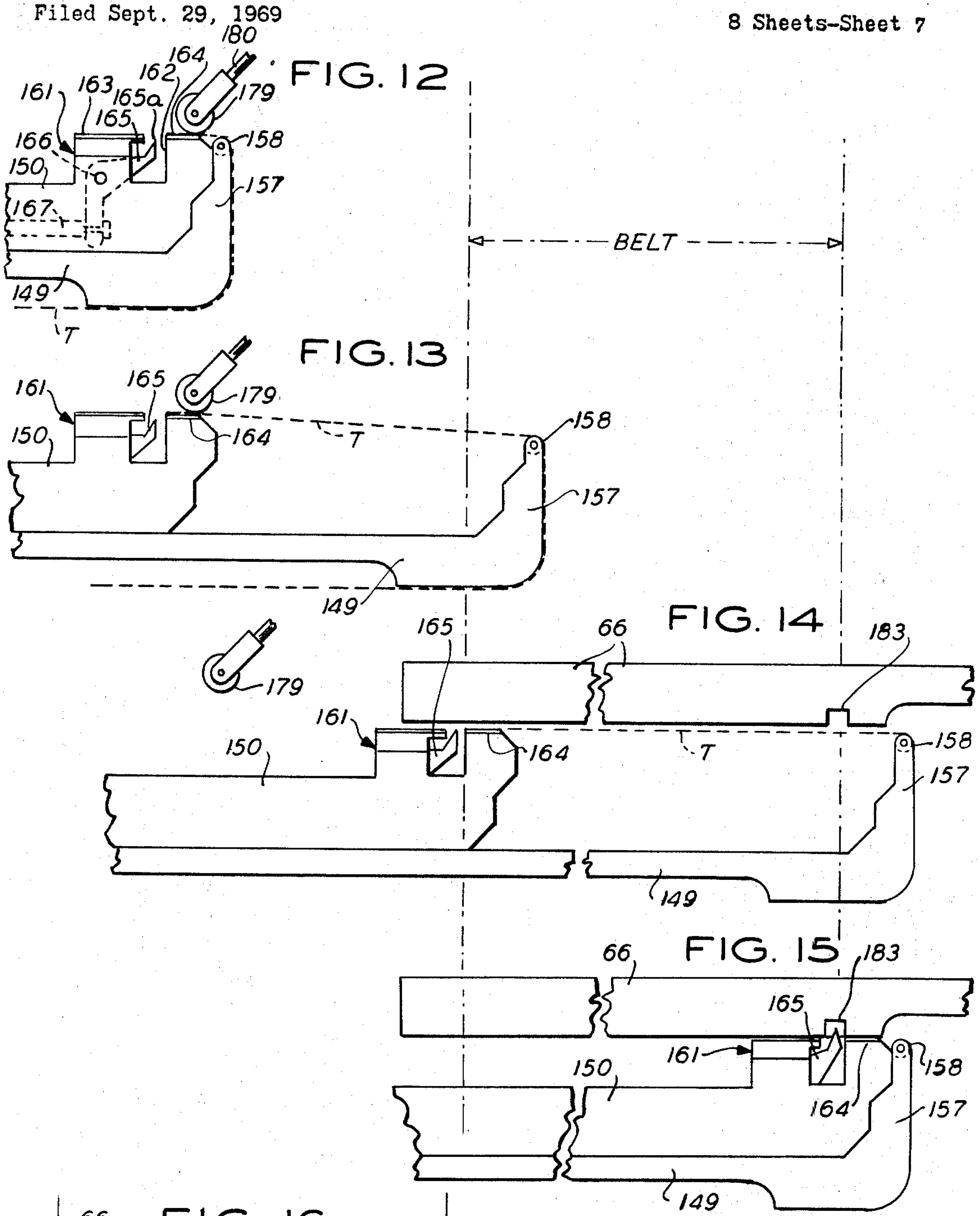
Figure 16:
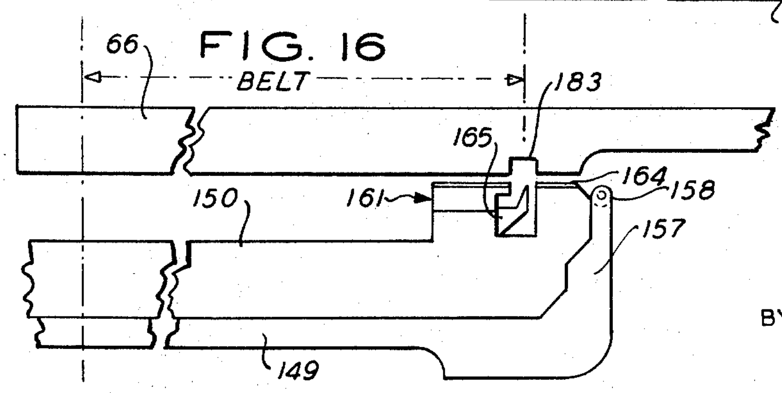
Figure 17:
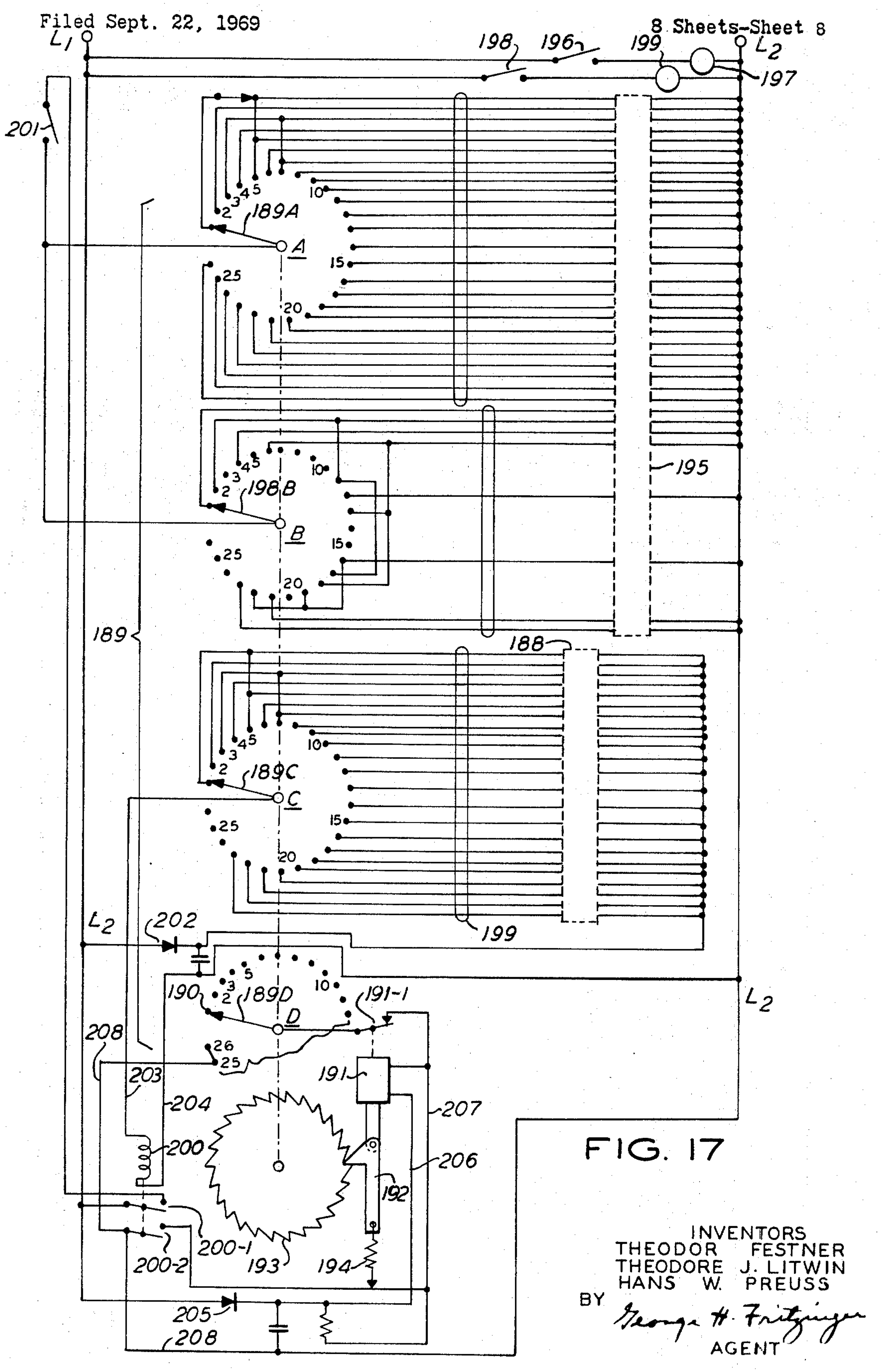

FIGS. 5A and 5B when joined along the dash-dot line B—B form a fractional front elevational view of the present production machine as seen from the line 5—5 of FIGS. 1A–1B;

FIG. 6 is a fractional front elevational view showing the loop-forming bars in the intermediate positions they occupy at the end of the linear portion of a loop-forming operation;

FIG. 7 is a fractional front elevational view showing the loop-forming bars in their end positions at completion of the rotary portion of a loop-forming operation;

FIG 8 is a vertical cross sectional view on the line 8—8 of FIG. 1B showing a right hand elevation of the tape splicing machine and of the left forming bar in operated position;

FIG. 9 is a right hand elevational view of the right tape cutter as seen from the line 9—9 of FIG. 1B;

FIG. 10 is a vertical sectional view on the line 10—10 of FIG. 9;

FIG. 11 is a fractional left hand view of the tape splicing head in its start position showing in section the air cylinder clamp for holding the end of the splicing tape during the advance of the tape pull-off bar;

FIG. 12 is a fractional right hand elevational view of the tape splicing mechanism shown in its start position;

FIG. 13 is a right hand view of the tape splicing mechanism showing the tape pull-off bar in extended position but with the applicator-cutter not yet operated;

FIG. 14 is a right hand view of the tape splicing mechanism showing the pull-off bar and applicator-cutter in their advance positions within the tape loop prior to the start of a splicing operation;

FIG. 15 is a right hand view showing the applicator pad and cutter at the end of its operating stroke;

FIG. 16 is a right hand view showing both the applicator cutter and pull-off bar shifted away from the belt record and ready to be withdrawn from the belt record to their start positions; and FIG. 17 is a diagrammatic view of circuits and mechanism by which the machine is programmed for automatic operation.

The present machine has a frame 10 including a base 11 and a heavy steel bed plate 12 supported on the base by a pair of legs 13 at its left end (FIGS. 1B and 5B), a single leg 14 at its right end and a pair of intermediate legs 15. The bed plate 12 includes a rectangular section **12*a* about two thirds the length of the plate and a right wing 12*b* of reduced width throughout its remaining length (FIGS. 1B and 1A). A rectangular opening 16 is located in the forward portion of the rectangular section 12*a* midway the length thereof. It is through this opening that the finished belt records are dropped onto a conveyor belt 17** as is later described.

A wide record tape 18 as of "Mylar" having a magnetic iron-oxide coating is provided on a supply roll 20 wound on a core 21. The core has a press fit onto a supporting spindle 22 of a constant tension unwinding machine 23 of standard construction. In such machine the tape is led around a pair of tension sensing rollers 24 journaled on a tension rocker 25 which is in turn journaled at its center on a shaft 26. Secured to the hub of the rocker 25 is a pulley 27 about which a cable 28 is wound. This cable leads to a winding-release control lever 29. The tension rocker is set to a selected tensioning of the tape 18. As the tape is drawn by a feed member 30 past an idler roller 31 mounted at the side of the bed plate 12 the rocker 25 will stand still unless the tensioning of the tape is in excess of a predetermined value. As the tension exceeds this value the rocker 25 is turned to operate the control lever 29 and permit a further unwinding of the tape from the supply roll 20.

The unwinding mechanism 23 is mounted on a base plate 32 having two blocks 33 secured to the underside thereof (FIG. 5A). These blocks are bored lengthwise thereof to receive slidably respective support rods 34 carried at their ends in blocks 35 mounted on the base 11. This mounting permits the whole unwinding mechanism to be shifted sidewise of the machine to enable the tape to be always drawn from the roll 20 in a true path without sidewise wandering notwithstanding any sidewise eccentricities in the winding of the supply roll. For this purpose a sensing photocell 36 is mounted on an arm 37 supported on the base 11 to detect the edge positioning of the tape 18 as it is drawn from the supply roll. Any sidewise wandering of the tape activates the photocell which in turn controls a solenoid valve 38 to activate an air cylinder 39 connected between the base 11 and the base plate 32. By this activation of the air cylinder 39 under control of the photocell 36 the unwinding mechanism 23 is shifted back and forth laterally of the machine as required to maintain a constant sidewise positioning of the tape 18 as it is drawn from the supply roll by the feed member 30.

The feed member 30 is in the form of an L-shaped arm formed of heavy sheet metal (FIGS. 1A and 5A). This arm has an enlarged base portion to the underside of which are welded two sets of blocks 40 and 41 bored to receive two parallel supporting rods 42 and 43. These rods are secured at their right ends in respective blocks 44 and 45 which are in turn mounted securely to a heavy rectangular plate 46. This plate is secured to a bearing box 47 having a bore hole received by a shaft 48 secured at its ends in support blocks 49 mounted on the bed plate 12. The plate 46 extends leftwardly from its pivoted end lengthwise of the machine about to the station where the belts are formed. At a point intermediate its length it is supported suitably by a rocker 50 pivoted to a bracket 51 mounted on the bed plate 12. This rocker is coupled to an air cylinder 52 pivotally secured at its base end also to the bed plate 12. The rocker stands normally in a tilted position as shown in FIG. 5A causing the feed arm 30 to have its normal resting position. Advance movement to the left of the feed arm 30 is produced by an air cylinder 53 pivoted at its base end to a bracket 54 on the bed plate (FIG. 5A) and having a piston rod extending below the base end of the feed arm and pivoted at 55 to a block 56 secured to the underside of the feed arm midway between the supporting rods 42 and 43 (FIG. 1A). When the feed arm is to be propelled to its left through its advance stroke, the air cylinder 52 is energized to raise the feed arm and the air cylinder 53 is then energized to advance the feed arm. During this advance movement the feed arm is moved along the two supporting rods 42 and 43 which are joined at their far ends by a bar **42*a*** (FIG. 1B).

Figure 4:
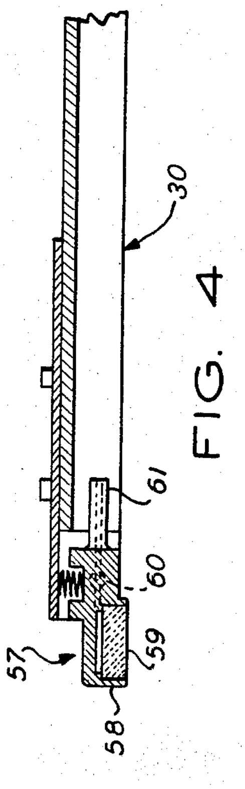
FIG. 4 is a sectional view of the reciprocable feed member taken on the line 4—4 of FIGS. 1A–1B.
Figure 2:
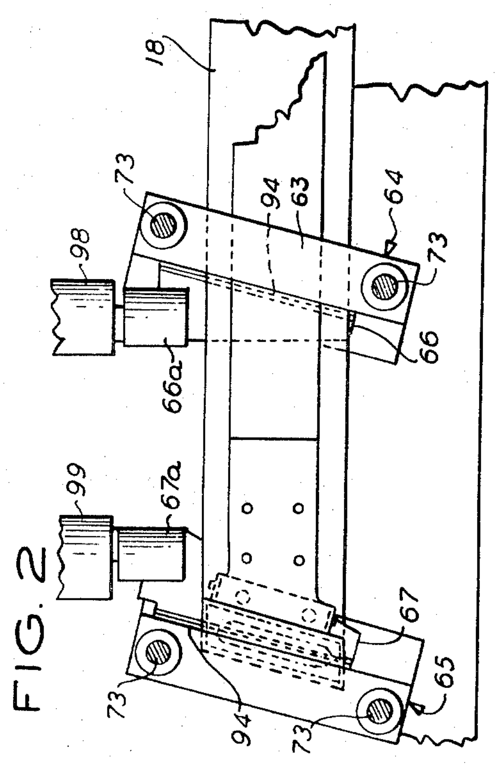
FIG. 2 is a plan view of a portion of this production machine showing the reciprocable feed member for the record tape at the end of its advance stroke.
Figure 3:
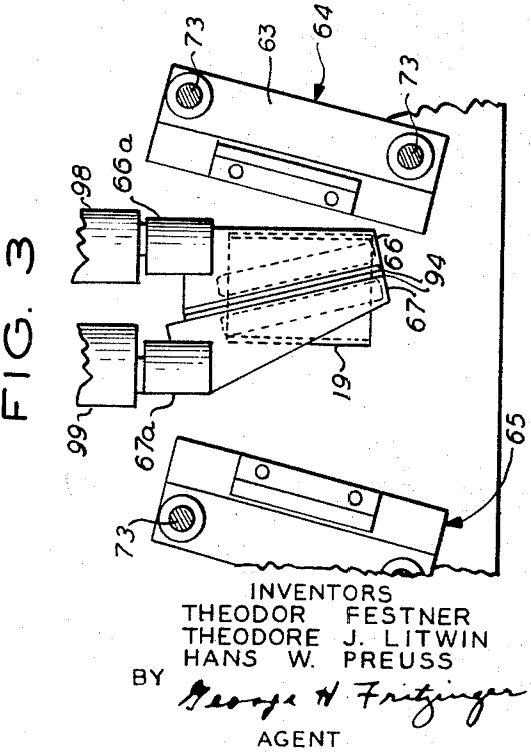
FIG. 3 is another plan view of a portion of this production machine showing the forming bars in operated positions for folding each strip of record tape into a loop.

The feed arm 30 has a suction head 57 at its advance (left) and comprising a rectangular cup-shaped member 58 which is mounted so that it is inverted and oblique to the direction of feed (FIG. 1B). This cup member has a shouldered opening at its underside in which a porous ceramic plug 59 is fitted against the internal shoulder (FIG. 4). The inner end of the opening is coupled by a duct 60 to a nipple 61. This nipple is connected to a pump for creating a vacuum effective through the porous plug to create suction at its bottom face for holding the leading end of the tape 18 thereto. Thus, upon applying a vacuum to the suction head and then feeding air pressure to the cylinders 52 and 53, the feed arm 30 is advanced to draw a length of tape 18 from the supply roll 20 as shown in FIG. 2. Upon shutting off the vacuum applied to the suction head, and applying pressure in the reverse direction to the air cylinder 53 the feed arm is returned, and upon then moving pressure from the air cylinder 52 the feed arm is lowered by its own weight causing the suction head to come to rest on a platform 63 (FIG. 1B) in its starting position.

The platform 63 is mounted on the base structure of a first guillotine cutter 64. (FIGS. 2, 9 and 10). During operation of the cutter the tape 18 is cut on a bias a short distance ahead of the starting position of the suction head 57. During a feed operation the feed arm is advanced through the cutter 64 past a second identical parallel cutter 65. At the time the tape is so fed, two horizontal forming bars 66 and 67 are located at the inner sides of the two guillotine cutters below the path of feed of the tape. These forming bars have suction faces 68–69 on their upper sides the same as described with respect to the suction head 57. At the time the vacuum is released from the suction head 57, a vacuum is applied to the suction faces 68 and 69 of the forming bars so that the latter will take over the holding of the tape in its fed-out position and permit return of the feed arm to its start position. After the feed arm is returned the guillotine cutters are operated to cut both ends of the tape on a bias to an exact length for a belt record.

Each guillotine cutter has a lower mounting bar 70 having a side extension forming also the platform 63 abovementioned (FIGS. 9 and 10). This mounting bar is secured to the bed plate 12 by screws 71. The mounting bar has upright tubular extensions 72 at its ends in which respective vertical guideposts 73 are press-fitted. These guideposts are joined at the top by a cross bar 74 secured to the posts by screws 75. Mounted on the central portion of the cross bar is an air cylinder 76 for operating the cutter. The air cylinder has a piston rod 77 extending through a central opening of the cross bar 74 and connected pivotally at 78 to a cross head 79. The cross head comprises a cross bar 80 having integral offset end portions slidably embracing the posts 73. Secured by four screws 81 against these offset end portions is a heavy side plate 82 in spaced parallel relation to the cross bar 80. Carried by the cross head between the cross bar 80 and side plate 82 is a mounting plate 83 for a cutting blade 84 secured to the lower part of the mounting plate by screws 85. The mounting plate 83 is locked to the cross head by a pin 86 pressed into the lower central part of the side plate 82 and loosely engaging the mounting plate, and by two side lugs 87 on the upper part of the mounting plate loosely interlocking with respective sets of spaced lugs 88 on the upper part of the cross bar 80. Additionally, the mounting plate 83 is spring-pressed laterally against three locating pins 89 on the side plate 82 (FIG. 9) by a compression spring 90 interposed between the mounting plate and head of a bolt 91 which loosely traverses the mounting plate and threads into the side plate. The blade 84 has a beveled cutting edge 92 which inclines slightly downwardly from left to right (FIG. 9). At the right end of the blade there is a long depending lug 93 which is slightly tapered from the cutting face of the blade to guide the cutting edge into scissors engagement with a cooperating horizontal blade 94 on the adjacent side of the respective forming bar 66 (FIG. 10). As the cross head is propelled downwardly by the air cylinder 76 the record tape is cut on a bias by the blades 84 and 94. Similarly, as the guillotine cutter 65 is operated the blade 84 thereof engages a cooperating blade 94 on the forming bar 67 to cut the leading end of the tape also on a bias end to an exact length.

The forming bars 66 and 67 have radial arms **66*a* and 67*a* at their back ends secured to respective horizontal shafts 96 and 97. These shafts are journaled in bearings 98 and 99 mounted on respective plate-shaped carriages 100 and 101 to permit the forming bars to be swung respectively in counterclockwise and clockwise directions from their end positions above described. The carriages are mounted slidably for movement end to end lengthwise of the machine. The mounting for the carriage 100 comprises two transverse block-shaped bearings 102 and 103 on its underside slidably embracing a pair of spaced parallel support rods 104 and 105. The support rods are mounted at their ends in blocks 106 secured to the bed plate 12. The carriage 101 has similarly two block-shaped bearings 107 and 108 slidably embracing a pair of spaced parallel support rods 109 and 110 mounted at their ends in blocks 111 secured to the bed plate 12. The carriages 100 and 101 are shifted respectively by air cylinders 112 and 113 located at the underside of the bed plate 12. Each air cylinder is pivotally connected at its base end by a bracket 114 to the bed plate. The piston rod of the air cylinder 112 is pivotally connected to a lug 115 depending from the block 103 through a clearance opening in the bed plate. The piston rod of the air cylinder 113 is pivotally connected to a rocker lever 116 extending through a clearance opening in the bed plate 12 and through a clearance slot in the block 107. This rocker is pivotally connected at its center to the block 107 on a cross pin 117 carried between two lugs 118 depending from this block. The upper end of the rocker lever 116** is pivotally connected at 119 to a piston rod of an air cylinder 120 pivotally connected at its base end to the carriage 101 as to a lug 121 extending from the block 108. The air cylinder 120 is held normally in retracted condition so that in effect the air cylinder 113 has a fixed connection to the carriage 101 the same as the air cylinder 112 has to the carriage 100. However, after the air cylinders 112 and 113 are operated into extended positions, an actuation of the air cylinder 120 will exert a further movement or pressure of the carriage 101 towards the carriage 100 to effect a tight closing of the forming bars, as is later explained.

The air cylinders 112 and 113 are normally in retracted positions (FIGS. 5A and 5B) to hold the carriages 100 and 101 in start positions farthest apart from each other. At the same time two air cylinders 122 and 123 mounted on the carriages 100 and 101 and having pistons with rack-pinion connections 124 and 125 to the shafts 96 and 97 are in their extended positions causing the forming bar 66 to be in a downward clockwise position and the forming bar 67 to be in a downward counterclockwise position shown in FIGS. 1A–1B and 5A–5B. These start positions of the forming bars are defined by abutment of radial arms 126 and 127 on the shafts 96 and 97 against respective stop members 128 and 129 on the carriages 100 and 101.

When the forming bars 66 and 67 are in their start positions abovedescribed, they are in parallel arrangement abutting against the inner sides of the base members of the guillotine cutters 64 and 65 wherein the cutting blades 84 of these cutters will be guided into scissors engagement with the blades 94 on the respective forming bars. The strip of record tape 18 is fed out past the forming bars by the feed head 30 is therefore cut to an exact length extending from the outer cutting edge of one forming bar to the outer cutting edge of the other forming bar. At the time the tape is cut, suction is applied to the faces 68 and 69 of the forming bars via conduits leading through the shafts 96 and 97 and radial arms 66*a* and 67*a* so that the strip of record tape for a belt record is securely attached near its ends to the upper faces of the forming bars.

In the next operation the carriages 100 and 101 are moved toward each other by the air cylinders 112 and 113 to bring the forming bars 66 and 67 into a closer parallel relationship causing the tape record strip carried thereby to be buckled downwardly between the forming bars as illustrated in FIG. 6. Thereupon the air cylinders 122 and 123 are operated to turn the forming bars 66 and 67 respectively in counterclockwise and clockwise directions each through approximately 180° to form the record strip into a closed loop as shown in FIG. 7. In this rotary movement of the forming bars the two cutting blades 94 are moved flat against each other. To assure a close engagement of the blades 94 against each other and an edge abutment of the tape record strip, the air cylinder 120 is actuated outwardly to exert further thrust of the carriage 101 towards the carriage 100 after the forming bars are turned. The tape loop so formed is wholly externally supported by the forming bars with its magnetic iron-oxide coating on the outer periphery. The inside of the loop is uncoated and ready to receive a length of splicing tape from the tape splicing mechanism 130 to form the loop into a permanent belt record.

The tape splicing mechanism 130 shown in FIGS. 8 and 11–16 is mounted on a forwardly extending angle-type support arm 131 secured to the bed plate 12 and to the forward one of the intermediate legs 15. At the outer end of this support arm there is a bearing block 132 in which a tilt plate 133 is pivoted on a cross shaft 134. The back or free end of this tilt plate has a clearance opening receiving a piston rod 135 of an air cylinder 136 secured to the arm 131. Between the tilt plate and a shoulder 137 on this piston rod is a compression spring 138 to provide a yieldable support for the free end of the tilt plate. The air cylinder is normally in retracted position shown in FIG. 8, but when activated operates to lift the tilt plate slightly upwardly. Mounted on the front and back ends of the tilt plate 133 are blocks 139 and 140 carrying a pair of spaced parallel support rods 141 (FIG. 1B). A long carriage plate 142 having two spaced bearing blocks 143 is slidably mounted on these rods. This carriage plate is shiftable back and forth from its forward or outermost position shown in FIG. 8 by an air cylinder 144 located below the tilt plate 133. The base end of this air cylinder is pivoted to a bracket 145 on the support arm 131 and the piston rod of the air cylinder is pivoted to a lug 146 depending from the rearward one of the bearing blocks 143 through a clearance opening in the tilt plate 133.

The carriage plate 142 has two bearing blocks 147 and 148 spaced lengthwise of the carriage plate and upstanding from the rearward half portion thereof. These bearing blocks have rectangular holes receiving a dual slide comprising a lower slide bar 149 and an upper slide bar 150. The lower slide bar is shiftable by an air cylinder 151 mounted parallel with the carriage plate on a bracket 152 secured to the outer end of this plate. This air cylinder has rearwardly extending piston rod 153 connected to the outer end of the slide bar 149. The upper slide bar 150 is shiftable by an air cylinder 154 pivoted at its base end to the upper end of the bracket 152. This air cylinder has a rearwardly extending piston rod 155 pivotally connected to an upstanding lug 156 secured to a central portion of the slide bar. The lower slide bar 149 has an upwardly curved arm 157 at its rear end on the upper end of which is journaled a tape feed roller 158. It is around this feed roller that a splicing tape 159 is drawn from a supply roll 160 as later described. The slide bar 150 has an applicator head 161 at its rear end which abuts against the arm 157 when the slide bar 150 is in its extended position relative to the slide bar 149. This head has a cross slot 162 dividing it into front and rear portions having flat faces parallel with the horizontal. These portions are covered respectively by rubber pads 163 and 164 of which the rear pad is employed as a tape applicator pad. These pads are at a level above the feed roller 158 as shown in FIG. 11. The rear pad 164 and the underlying portion of the head is apertured and connected with a source of vacuum so that the pad will hold the splicing strip thereto when the vacuum is applied. A blade lever 165 is pivoted in the head 161 on a cross pin 166 and has a hot-wire blade 165*a* mounted thereon in the slot 162 with its edge standing upwardly but at a level just slightly below that of the pads 163 and 164. This blade lever has an extending arm below its pivot axis connected to a long piston rod 167 of an air cylinder 168. The air cylinder is mounted on the front end of the slide bar 150 and the piston rod extends therefrom through the full length of the slide bar 150 via a groove in the side wall of the bar.

The supply roll 160 of splicing tape is mounted on a reel 169 journaled on a spindle 170. This spindle is staked to a bracket plate 171 secured to the rear bearing block 143 of the carriage plate 142. Pivoted also on the spindle at the rear of the reel 169 is a tensioning arm 172 having a roller 173 journaled on the outer end thereof. The tensioning arm is biased slightly by a torsion spring 174 in a clockwise direction as it appears in FIG. 8.

The splicing tape 159 is drawn from the supply roll 160 around a guide roller 175 journaled on the bracket plate 171 above the supply roll. From the guide roller 175 the tape is led past another guide roller 176 journaled also on the bracket plate and then around the tensioning roller 173 back to another guide roller 177 journaled on the bracket plate at a level above the path of the tensioning roller 173. An arcuate slot 178 in the bracket plate provides clearance for the tensioning roller as the tensioning arm 172 is drawn to the left against the force of the torsion spring 174. From the upper guide roller 177 the splicing tape is led rearwardly around the back side of the arm 157 and around the feed roller 158 onto the applicator pad 164. Here the tape is held to the pad by the suction above explained. However, to secure a still stronger grip of the tape to the applicator pad during the time the splicing tape is drawn from the supply roll, a pressure roller 179 preferably of silicon rubber is journaled on the end of a plunger 180 of an air cylinder 181 and urged by air pressure from a line 182 onto the pad 164 (FIG. 11).

At the start of operation of the tape splicing mechanism the support table 133 is in its lower position, and both slides 149 and 150 are retracted as shown in FIGS. 8 and 12. The splicing tape 159 is now leading from the supply roll past the fixed rollers 175 and 176, tensioning roller 173, fixed roller 177 and back across the back end of the slide bar 149 and across the feed roller 158 onto the applicator pad 164 whereat the leading end of the tape with the adhesive side facing upwardly is held by suction and by the pressure roller 179. The first step is a feed operation wherein the slide bar 149 is moved forwardly by the air cylinder 151 through an advance stroke sufficient to draw a length of splicing tape T from the supply roll equal at least to the full length of a magnetic belt as shown by FIG. 13. During this advance stroke the tensioning arm 172 yields to the tensioning of the tape to keep the tape taut at the end of the feed stroke. The second step is to advance the slide carriage 142 by the air cylinder 144 through approximately the length of a belt record while retaining the slide bars in the same spaced relationship to each other shown in FIG. 13. This second step is carried out before the tape loop is formed so as to save time. Thus, when the tape loop is formed a length T of tape is extending throughout the length of the loop as shown in FIG. 14. During this last step the applicator pad 164 is moved off the pressure roller, this being now permissible because there is no tension exerted on the tape which the suction on the pad 164 is not capable of holding. The third step is to raise the tilt table upwardly by the air cylinder 136. In this operation the applicator pad 164 with the tape thereon is pressed into adhesive engagement with the inside wall of the record loop. The tape so applied extends across the joint between the abutting edges of the tape loop onto an area of the tape loop backed by the forming bars 66 and 67. Because of the spring coupling between the air cylinder 136 and tilt table 133 the applicator pad 164 is now pressed yieldably against the inside periphery of the tape loop. The fourth step is to move the slide bar 150 by the air cylinder 154 along the joint of the tape loop while the tilt cylinder 136 remains actuated until the head 161 reaches the feed roller 158. During this stroke the applicator pad 164 progressively applies the splicing tape leading to the feed roller 158 into adhesive engagement with the inside wall of the tape loop as shown in FIG. 15. At the end of this stroke the blade **165*a* is in registration with a cross slot 183 in the forming bars 66 and 67. The fifth step is to turn the blade lever 165 upwardly into the slot 183 by the air cylinder 168. Since the tape is clamped tightly against the inside wall of the tape loop by the pads 163 and 164 when the blade lever is so actuated, the blade 165*a* cuts through the tape bridging the slot 162. Thereupon, as a sixth step the tilt cylinder 136 and blade actuating cylinder 168 are retracted to lower the head 161 from the tape record loop and to retract the blade from the level of the two pads 163 and 164 (FIG. 16). In the next step, both slide bars 149 and 150 are retracted in unison to bring these slide bars to their start position relative to the carriage plate 142, and the carriage plate 142 is retracted relative to the frame arm 131 to move the head 161 and the feed roller 158 out of the loop to their start positions shown in FIG. 8. A last step in each forming operation is to cut off the suction grip of the forming bars so that the belt record may fall through the bed plate 12 via the opening 16 onto the conveyor belt 17**.

The machine is now ready to be restored to a start condition for the feed out of another length of record tape from the supply roll 20. This is accomplished by first turning the forming bars 66 and 67 each by 180° respectively in clockwise and counterclockwise directions by the air cylinders 122 and 123, and by then moving the carriage plates 100 and 101 apart by the air cylinders 112 and 113 to restore the forming bars 66 and 67 into a parallel arrangement below the path of feed of the record tape with the forming bars being pressed against the inside walls of the guillotine cutters 64 and 65 so that when these cutters are next actuated the blades 84 will engage the respective blades 94 on the forming bars to cut off another strip of record tape to an exact length. During this final operation, the conveyor belt 17 may be advanced one interval by a ratchet mechanism 184 operated by an air cylinder 185 (FIG. 5B). The conveyor belt may have outwardly projecting fins 186 spaced by the distance of each step advance of the belt to form compartments 187 for the respective belt records. The outer portion of the conveyor belt (not shown) operates to drop the successive belt records into a suitable container. The successive steps constituting a work cycle for producing a complete magnetic belt record are controlled in the main by a multiplicity of normally closed limit and/or vacuum switches operated at the completion of the respective steps. These switches are herein referred to as detector switches and are shown diagrammatically as a group at 188 in FIG. 17. This manner of programming the machine for automatic operation provides the fastest operation since each step or group of steps when several are carried out simultaneously, is started the instant the preceding step is completed; also, it provides a fail-safe operation since the machine is stopped against proceeding if for any reason a step operation is not carried out to completion. Only three step operations are controlled on a timed basis: (1) the removal of vacuum from the tape applicator mechanism 130 (2) the upward travel of the hot wire tape cut off, and (3) the removal of vacuum from the form bar 66–67. These timed operations are carried out by solid-state time delay relay circuits.

The automatic operation is carried out by a four-deck stepping switch 189 having twenty-six positions of which twenty-four are used in a production cycle. Two decks A and B are used in programming the machine, a third deck C is connected to the respective detector switches 188 to index the stepping switch, and a fourth deck D is used only in positions twenty-five and twenty-six with a bridging contact arm 190 for advancing the stepping switch 189 through the last two positions of a cycle into the first position of a next cycle.

The stepping switch is advanced by an indirect drive comprising a solenoid 191 which cocks an indexing pawl 192 in relation to a ratchet wheel 193 each time the solenoid is energized. The advance is carried out by a spring 194 which actuates the pawl 192 when the solenoid is deenergized. When the stepping switch is advanced to a new position the index solenoid 191 is energized via the respective normally closed detector switches 188 of that new position of deck C. If two or more step operations are being monitored simultaneously there are two or more detector switches connected in parallel so that all of those steps must be completed before the detector switches corresponding to that position are opened to drop the solenoid 191 and index the stepper switch 189. At each position of the stepper switch, one or another solenoid valve 195 is activated via the decks A and B to complete the respective step operations of the machine.

The control system is powered from a 110 volt A.C. line $L_1$–$L_2$. Connected across the line via an on-off switch 196 is a hydraulic pump 197 and via an on-off switch 198 is a vacuum pump 199. When a relay 200 is activated the rotor arms 189A and 189B of the decks A and B become electrically connected to the power line $L_1$ via the relay switch 200–1 and an on-off manual switch 201 whereby to connect the respective solenoid valves 195 across the power line $L_1$–$L_2$. The relay 200 is activated at each position of the stepping switch 189 from line $L_1$ via rectifier 202, respective detector switch 188, pole 189C of deck C and leads 203 and 204 to power line $L_2$. At the same time the relay 200 is activated, the solenoid 191 is activated from the line $L_1$ via the rectifier 205, leads 206 and 207 and relay switch 200–2 to power line $L_2$. The solenoid thus holds the pawl 192 cocked during the time a step operation is in progress. When the step operation is completed the resultant opening of the respective detector switch 188 drops the relay 200 allowing the spring 194 to advance the stepper switch 189. As the stepper switch is so advanced the next detector switch will complete the circuit for the relay 200 whereby to activate the next solenoidal valve 195 and again the solenoid 191 to cock the pawl 192 in preparation for another step advance of the stepper switch. These step operations of the machine are thus carried out in sequence, and unless the machine fails in completing any one of the step operations it will proceed automatically through all twenty-four step operations to produce a complete magnetic belt.

At the end of the twenty-fourth step constituting the last step operation of a complete cycle, the rotor arm 189D of deck D makes with contacts 25 and 26 to activate the solenoid 191 from the power line L via the rectifier 205, lead 206, solenoid 191, solenoid switch 191–1, switch arm 189D and lead 208 to power lead $L_2$. The solenoid 191 is thus activated to cock the pawl 192 and in so doing it breaks the switch contacts 191–1 to release the pawl immediately whereby to allow the spring 194 to advance the stepping switch by one step. The solenoid switch 191–1 is closed at the end of this step to start another step advance with the result that the stepping switch is advanced quickly through positions twenty-five and twenty-six to position 1 of a new cycle.

We claim:

1. In a machine for producing belt records from a supply roll of wide record tape: the combination of a pair of spaced loop-forming bars having means for releasably holding a rectilinear strip of said tape thereto, said bars having cutting edges along the outer sides thereof, and respective cutting blades actuatable into engagement with said cutting edges for severing said strip from said supply roll with the strip spanning the bars widthwise thereof and the space therebetween.

2. The machine set forth in claim 1 including means for moving said bars to flex said strip into a loop having an edgewise abutment of said strip at the ends thereof.

3. The machine set forth in claim 2 wherein said bars have flat gripping faces along said cutting edges and in co-planer relationship when said blades are actuated to cut the tape, and wherein said moving means includes rotating means to swing said bars to bring said outer cutting edges evenly against each other with said gripping faces holding said strip at the ends thereof in a closed loop.

4. The machine set forth in claim 3 wherein said gripping faces comprise porous plates and vacuum producing means coupled to the inner sides of said plates to render said plates effective to hold said tape releasably to said bars by suction.

5. The machine set forth in claim 3 including a splicing mechanism for applying a splicing tape along said abutting edges to the side of said loop opposite said forming bars while the strip is held in a loop by said bars.

6. The machine set forth in claim 5 wherein said bars are turned to form said strip into a loop with the bars gripping the outer side of the loop, and said splicing mechanism is movable into the loop to splice the loop along its inside wall.

7. The belt record producing machine set forth in claim 3 wherein said cutting edges are in the planes of said respective tape-gripping faces, including stop members for locating said bars in start positions wherein said faces are spaced from each other in a common plane, and wherein said shiftable cutting blades are mounted for movement in scissors engagement with said cutting edges when said bars are in said start positions for cutting said strip of record tape to a length leading from one cutting edge to the other across the respective forming bars and the space therebetween.

8. The belt record producing machine set forth in claim 7, including means for pivotally supporting said forming bars for movement about respective journal axes parallel to each other and to the common plane of said tape gripping faces wherein said outer cutting edges are parallel to each other at the start and end positions of said forming bars and are at an angle to said journal axes to cause said strip to be cut on a bias.

9. The belt record producing machine set forth in claim 7, including means for first moving said forming bars from said start positions towards each other in parallel movement, and for thereupon swinging said bars about respective parallel axes through 180° ranges to flex said strip of record tape into a closed loop.

10. The belt record producing machine set forth in claim 9, including means for pressing said bars together in parallel movement after said bars have been swung through said 180° ranges.

11. The belt record producing machine set forth in claim 7, wherein said forming bars are turned in directions causing said loop to be held by grip of said forming bars with the outer surfaces of the loop, and wherein said splicing means includes a tape applicator movable into said loop to apply the splicing tape to inside surface portions of the loop bordering the joint of the loop and backed by said forming bars, including means for withdrawing said applicator from the loop after the length of splicing tape is applied and for thereupon releasing the grip of said forming bars to allow the belt record to be discharged from the machine.

12. The belt record producing machine set forth in claim 11, wherein said splicing tape is provided in roll form and has an adhesive contact of one convolution on the other requiring a predetermined pull on the tape to draw the tape from the supply roll, and wherein said splicing mechanism includes means for first drawing a length of tape from said supply roll sufficient for a splicing operation, tape tensioning means to keep said tape length in a taut condition, and means for progressively applying said tape length to said record loop along the length thereof while the tape is held taut only by said tensioning means.

13. The belt record producing machine set forth in claim 12, wherein said splicing tape is provided in roll form and has an adhesive contact of one convolution on the other requiring a predetermined pull on the tape to draw the tape from the supply roll, and wherein said splicing mechanism includes an applicator pad, means for releasably holding the end of the tape onto said applicator pad with the adhesive side facing away from the pad, a feed roller movable against the splicing tape from a position adjacent to said pad in the direction of a tape applying operation to draw a length of tape from said supply roll extending from said pad to said feed roller, and means for moving said pad against a surface portion of said loop at one end thereof and for thereupon moving the pad towards said feed roller while the latter is held stationary for progressively applying said tape length to said loop along the length of the loop.

14. A machine for cutting pieces of wide magnetically coated plastic tape to a predetermined length from a tape supply and splicing the pieces edgewise into a closed loop to form a permanent magnetic belt record, comprising a supporting reel for a supply roll of said tape, a reciprocable feed member having releasable suction means for gripping one side of a leading end portion of the tape and drawing a predetermined length of the tape into a work position as the feed member is advanced from a start to an end position, first and second forming members having suction surfaces for releasably gripping the other side of the leading and trailing portions of said length of tape, means for releasing said feed member from the tape and returning the same to start position, cutting members on said first and second forming members at the leading and trailing edges of said suction surfaces defining said predetermined length, shiftable blades cooperable with said respective cutting members for severing the tape at the leading and trailing edges of said first and second forming members while the tape is supported by said members, means for moving said support members to form said length of tape into a loop with the ends in edgewise abutment to each other and with the support members outside said loop, means movable into said loop to splice the abutting edges together while the loop is supported by said support members, and means for thereupon releasing said support members from said loop to permit the removal of the loop therefrom.

15. The machine set forth in claim 14 including a pair of carriages mounted for rectilinear movement, bearings in adjacent ends of said carriages extending crosswise of the direction of the tape carried by said forming members, and crankshafts in said bearings carrying said foming members for revolving movement.

16. The machine set forth in claim 15 including means for moving said carriages and for thereupon turning said crankshafts to form said tape length into a closed loop.

17. The machine set forth in claim 15 wherein said journal axes of said crankshafts are spaced from said one side of the tape when in said work position, and wherein said carriages are first moved rectilinearly toward each other and said crankshafts are thereupon turned in opposite directions to each other to form said tape lengths into a closed loop.

18. The machine set forth in claim 17 including means for exerting pressure on said bars against each other to hold said cutting members in contiguous relationship while said splicing means is operated.

19. The machine set forth in claim 17 including a frame, means mounting said carriages on said frame, separate mounting structures on said frame for said shiftable blades, stop members on said frame for locating said forming members in start positions wherein said shiftable blades will engage said cutting members is scissor relationship when the shiftable blades are operated, respective actuatable means for said shiftable blades, carriages and crankshafts, said actuatable means being normally in condition to hold said shiftable blades in start positions and said forming members in said unoperated positions, and means controlling said actautable means for first operating said shiftable blades to cut the tape to a predetermined length and for thereupon moving said carriages towards each other and for rotating said crankshafts to bring said forming members into operated positions wherein said suction gripping surfaces are in a common plane and said cutting members are abutting each other under pressure causing the tape to be held in a closed loop.

20. In a machine for producing belt records from a supply roll of wide record tape: the combination of means for drawing off tape from said suppy roll of a length sufficient for a record belt, a tape splicing mechanism including a supply roll of pressure-sensitive tape and an applicator head, means for advancing said head to draw a length of splicing tape from the supply roll thereof equal at least to the length of a record belt, means for releasably gripping said length of record tape at the ends thereof and then severing the same to an exact length, means for thereupon moving said gripping means to fold the severed strip of record tape into a closed loop with the gripping means engaging the outer side of the loop and with the loop enveloping said applicator head standing in its advanced position, and means for pressing said head against the inside wall of said loop across the joint between the ends of said strip and then returning the head to apply said splicing tape whereby to form said loop into a permanent belt record.

References Cited

UNITED STATES PATENTS 3,086,901 4/1963 Ploeger ............ 156—159

FOREIGN PATENTS 580,846 1959 Canada ............ 156—505

SAMUEL FEINBERG, Primary Examiner

J. V. DORAMUS, Assistant Examiner

U.S. Cl. X.R.

156—506, 443, 362